INVENTOR
JAMES M. CLINE
BY Kenneth S. Grace
ATTORNEY

INVENTOR
JAMES M. CLINE
BY Kenneth T. Grace
ATTORNEY

United States Patent Office 3,510,856
Patented May 5, 1970

3,510,856

GROUNDING SWITCHES FOR DIFFERENTIAL SENSE AMPLIFIERS IN MEMORY SYSTEMS

James M. Cline, Fridley, Minn., assignor to Sperry Rand Corporation, New York, N.Y., a corporation of Delaware Filed Jan. 29, 1968, Ser. No. 701,433
Int. Cl. G11c *7/02, 11/00, 11/14*
U.S. Cl. 340—174 3 Claims

ABSTRACT OF THE DISCLOSURE

A system of grounding switches that couple to ground both input terminals of a parallel coupled bit-driver, differential sense amplifier arrangement which arrangement is coupled to a memory system wherein the grounding switches, during the read and write cycles are normally in the low impedance state, but are switched into a high impedance state only during the actual read-out and write-in of the memory system.

BACKGROUND OF THE INVENTION

The present invention relates to the electronic data processing field and in its preferred embodiment to an electrically alterable memory system for using electrical conductors plated with a thin-ferromagnetic-film layer as the memory elements. Such memory systems are well known for their principal advantage lying in their adaptability to mass, or batch, fabrication techniques which provide high volumetric efficiency, i.e., many binary digits, or bits, per cubic inch, and the resulting economy. An excellent background for such memory systems appears in the publication, "A 500-Nanosecond Main Computer Memory Utilizing Plated-Wire Elements," AFIPS, Conference Proceedings, vol. 29, 1966, FJCC, pp. 305–314.

Plated-wire memory systems utilizing the magnetization of areas along a conductive wire plated by a thin-ferromagnetic-film layer may be operated in the well-known word-organized or bit-organized memory systems. The high volumetric efficiency achieved by such memory systems must necessarily bring the several areas of magnetization, each representing discrete bits of digital data, and their associated circuitry into closer proximity whereby there arises "noise" signals that are similar to those obtained in more conventional toroidal ferrite core arrays. With the plated-wire digit wires, which are normally established in a parallel, planar array, and enveloped by a plurality of word lines orthogonal thereto, there is provided the normal capacitive and inductive coupling between adjacent digit lines and word lines whereby memory selection currents may induce noise signals in the selected digit lines that are of such a magnitude as to substantially block out the digital significance of the readout signal. An excellent background for such noise signal conditions appears in the publication "Crosstalk and Reflections in High Speed Digital Systems," AFIPS, Conference Proceedings, vol. 27, part 1, 1965, FJCC, pp. 511–525. Accordingly, several prior art techniques for the elimination of such deleterious noise signals have been incorporated in plated-wire memory systems.

One prior art technique often utilized to eliminate, or reduce deleterious noise signals in the utilization of a "dummy" wire or line. In toroidal ferrite core arrays such dummy lines generally consist of a conductor running parallel to and associated with a particular output or sense line such that the dummy line and the output line are effected by substantially the same noise signals whereby there is induced in such lines similar common mode noise signals. The dummy line and the output or sense line are coupled to a differential sense amplifier which cancels out the common mode noise signals leaving only the desired readout signal as an output therefrom. In plate-wire memory systems the dummy line usually consists of a digit line, similar to that of the other plate-wires of the plated wire array, which is coupled in parallel, by suitable gating means, with a plurality of digit lines.

In the copending patent application of C. A. Nelson, Ser. No. 508,695, filed Nov. 19, 1965, now Pat. No. 3,465,312, there is disclosed a plated-wire memory system that is comprised of two sections, each section having a plurality of active wires and an associated dummy wire for memory noise cancellation. This copending patent application provides an active wire, dummy wire selection system whereby for a read cycle the selected dummy wire is that dummy wire that is in the section of the memory system not including the selected active wire. This arrangement provides the coupling of both selected and unselected noise signals to the differential amplifier whereby there is provided an improved signal-to-noise ratio over that permitted by prior art systems. Memory array packaging schemes, such as disclosed in the copending patent application of L. J. Michaud et al., Ser. No. 644,861, filed June 9, 1967 assigned to the Sperry Rand Corp. as is the present invention, provided for the compact arrangement of plated-wire memory two-dimensional arrays such as is contemplated by the above discussed copending patent application of C. A. Nelson.

In such two-dimensional arrays a plurality of active wires and dummy wires are arranged in parallel planar tunnels insulatively sandwiched between an enveloping ground plane for electromagnetic shielding. The active wires and the dummy wires are, at one end, coupled to ground spatially along a ground plane that may be electrically continuous with the enveloping ground plane. In memory systems incorporating such two-dimensional arrays, such as the above reference copending patent application of C. A. Nelson, the active wires and the dummy wires are divided into at least two sections, each section having a plurality of active wires and an associated dummy wire for memory noise cancellation. The selection of any active wire and any dummy wire is accomplished by a single-ended selection technique through a line switch associated with each of the active wires and the dummy wires. The line switches of all of the active wires and the dummy wire in each of the two memory sections are coupled in common to separate associated common busses. The common bus of each memory section is, in turn, couple in parallel to first and second terminals of the associated differential sense amplifier and the bidirectional bit driver.

For a read operation the memory selection system selects, by enabling the associated line switches, one active wire in one of the memory sections and the dummy wire in the other end of the memory sections whereby the active wire is coupled to a first terminal of the differential amplifier and the dummy wire is coupled to the other terminal of the differential amplifier. This arrangement aids the noise cancelling feature of the differential amplifier. However, it has been discovered that when no active wire, dummy wire pair in such system is selected, i.e., nonselected, the capacitance of the low-level line switches that are not selected, i.e., disabled, must discharge through a relatively large magnitude terminating resistor. During this time a decaying voltage is applied to the input terminals of the differential amplifier. As it is not possible to read out or sense another active wire, dummy wire pair until this decay voltage has diminished to a negligible signal level, the nonselected discharge RC time constant of the line switches limit the rate at which the memory system may be operated, i.e., determine the minimum memory cycle time. It is desirable that this discharge time be substanitally decreased whereby the memory cycle time may be decreased accordingly.

SUMMARY OF THE INVENTION

The present invention is directed toward a system of and a method of using grounding switches for grounding each of the two common input terminals of a memory system's parallel coupled bit-driver, differential amplifier, and, accordingly, the associated active wire and dummy wire line switches; e.g., during the read cycle, except for that period of time when the differential amplifier is directed to provide a desired readout signal, and during the write cycle, except for that period of time when the bit-driver is directed to provide a desired write signal. In general, it is preferred that these grounding switches, i.e., the switches that couple the respectively associated terminals of the differential amplifier and the bit-driver to ground, couple to ground such input terminals except during the times of the actual write-in and readout operation. At all other times it is preferred that these grounding switches be in their low impedance state providing a low impedance path for the discharge of the associated line switches therethrough.

DESCRIPTION OF THE PREFERRED EMBODIMENT

Figure 1:
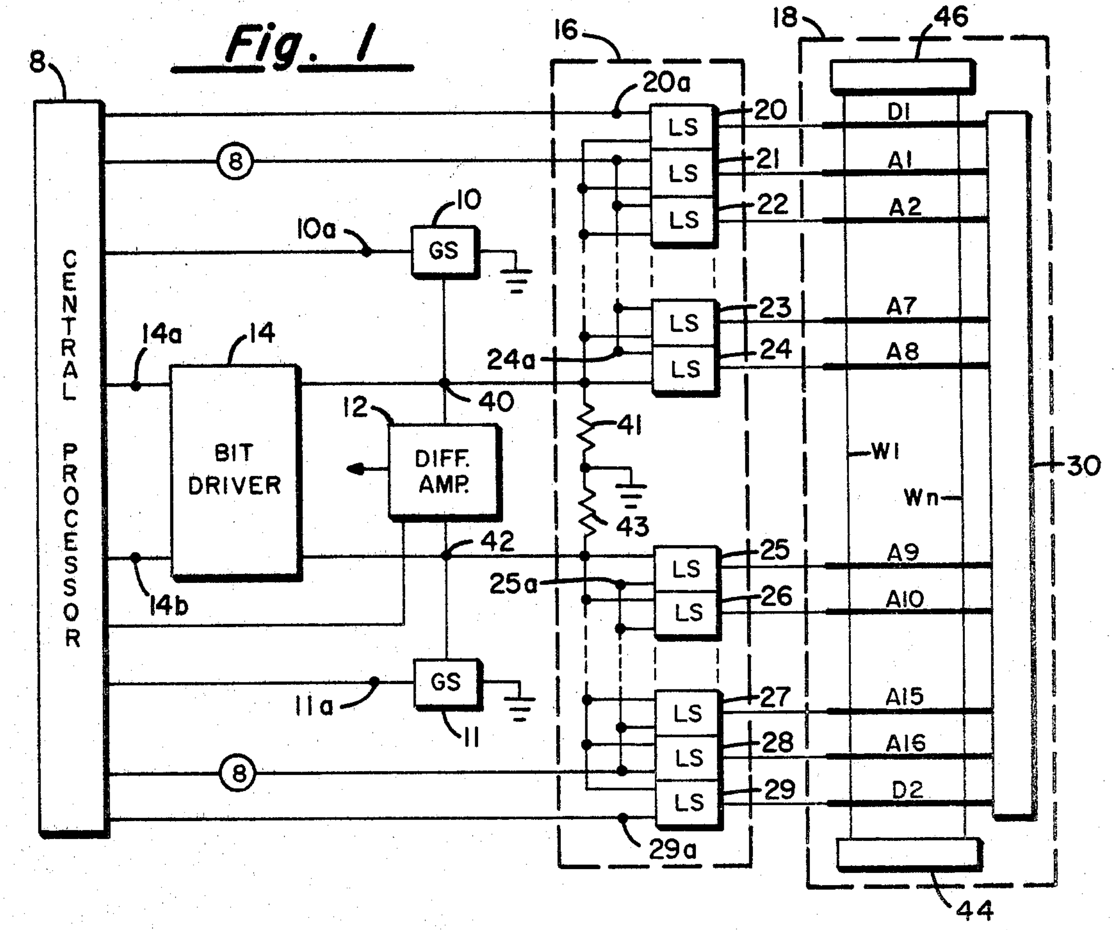
FIG. 1 is an illustration of a block diagram of a memory system incorporating the present invention.

With particular reference to FIG. 1 there is presented an illustration of a block diagram of a memory system incorporating the present invention. The memory system of FIG. 1, except for the grounding switches 10, 11, may be similar to that disclosed in the copending patent application of C. A. Nelson, or of A. E. Liepa, Ser. No. 701,591, filed Jan. 30, 1968. Accordingly, the inventive concept of the present invention is considered to be embodied within the addition of grounding switches 10, 11 to an otherwise well-known memory system which includes a differential amplifier 12, bit-driver 14, line switch array 16 and two-dimensional memory array 18, which components are controlled by central processor 8, all of which may be of any of many well-known configurations. Memory array 18 includes 16 active wires and 2 dummy wires: active wires A1–A16 divided into two equal sections; a first memory section including 8 active wires A1–A8 and their associated dummy wire D1 and a second memory section including 8 active wires A9–A16 and their associated dummy wire D2. The fabrication of such plated-wire memory array may be any well-known means including that of the above described copending patent application of L. J. Michaud et al. The selection of any active wire A1–A16 and any dummy wire D1, D2 is accomplished by a single-ended selection technique through line switches 20–29. With active wires A1–A16 and dummy wires D1, D2 coupled at one end to a ground plane 30 the selection of the appropriate line switch 20–29 selects the associated active wire or dummy wire.

Operation of the memory system of FIG. 1 is initiated by the multibit word, four-bits in the illustrated example of 16 active wires, which is representative of the address of the desired active wire A1–A16, being coupled to an active wire selector, a part of central processor 8 but not illustrated, which translates the four-bit present address word selecting one of the 16 gating lines that couple the active wire selector to line switches 21, 22, 23, 24, 25, 26, 27 and 28. Concurrently, a dummy wire selector, a part of central processor 8 but not illustrated, selects 1 of the 2 gating lines that couple the dummy wire selector to line switches 20, 29. This selection process, by a dummy wire selector and an active wire selector, couples the addressed active wire, dummy wire pair to nodes 40, 42. Nodes 40, 42 are coupled in common to respective sides of bidirectional bit-driver 14 and differential amplifier 12 and associated terminating resistors R; 41, 43, respectively. As in the above noted copending patent application of C. A. Nelson, the differential amplifier 12 or bit-driver 14 are alternatively coupled to such nodes 40, 42 for the read or write operations, respectively. Additionally, as is well-known, word drive selector 44, for the read and write operations, couples the appropriate currents to the *n* word lines W1, **W*n* which are terminated in terminating network 46. In essence then, the selection of an active wire, dummy wire pair may consist of the selection of an active wire in a first memory section, e.g., active A1, and the selection of a dummy wire in the other memory section, e.g., dummy wire D2. This selection system couples the selected active wire to an associated input terminal of the differential amplifier 12, e.g., active wire A1 is coupled to node 40, while the selection system couples the selected dummy wire to the other associated input terminal of the differential amplifier 12, e.g., dummy wire D2 is coupled to node 42**.

Figure 2:
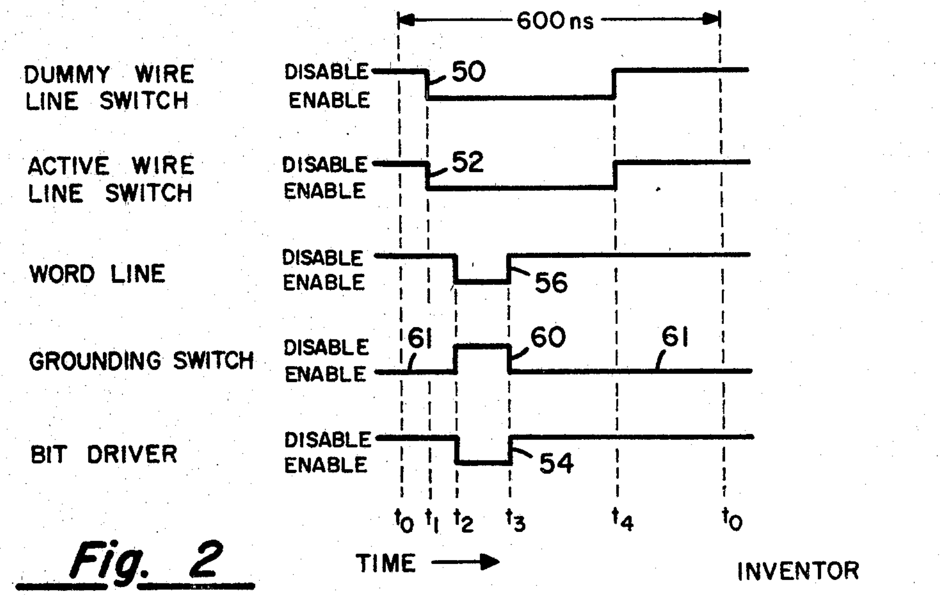
FIG. 2 is an illustration of a timing diagram of the signals associated with the present invention.

With particular reference to FIG. 2 there is presented an illustration of a timing diagram of the signals associated with the illustrated embodiment of FIG. 1. In subsequent discussions with respect to the selection of line switches 20–29 at their associated terminals **20*a*–29*a* it shall be assumed that a ground signal, equivalent to a logical "0," shall enable the associated line switch while a +3 volt signal, equivalent to a logical "1" shall disable the associated line switch. Therefore, for any selection period only one line switch 21, 22, 23, 24, 25, 26, 27, 28, each coupled to a respectively associated active line A1, A2, A7, A8, A9, A10, A15, A16, shall have a ground signal, equivalent to a "0," coupled thereto selecting only one of such active lines. Concurrently only one of such line switches 20, 29, each associated with its respective dummy line D1, D2**, shall have a ground signal, equivalent to a logical "0," coupled thereto. All of the other line switches, i.e., the non-selected line switches, shall be disabled by the coupling of a +3 volt signal, equivalent to a logical "1," thereto.

During a prior art memory cycle, 600 nanoseconds (ns.) in the illustrated example, the write operation consists, at a time $t_1$, of the concurrent coupling of the dummy wire line switch select pulse 50 and the active wire line switch select pulse 52 to one of the terminals **20*a*, 29*a*, and to one of the terminals 21*a*, 22*a*, 23*a*, 24*a*, 25*a*, 26*a*, 27*a*, 28*a*, of the respectively associated dummy lines, D1, D2, and active lines A1, A2, A7, A8, A9, A10, A15, A16. Next, at time $t_2$, bit-driver 14 is enabled by the coupling of a bit-driver select pulse 54 to an associated input terminal 14*a* or 14*b* representative of the writing of a "1" or of a "0" into memory array 18. Concurrent with the coupling of pulse 54 to bit-driver 14, word line selector pulse 56 is coupled to word line selector 44 for the writing of the appropriate information in memory array 18. For a read operation, pulses 50, 52 are concurrently coupled to the associated line switches of the selected dummy wire, active wire pair in the nature of the previously described write operation. Next, word line selector 44 is effected by pulse 56 whereby the appropriate current signal is coupled to one of the selected word lines W1, W*n* thereby inducing associated signals in the selected active wire, dummy wire pair which signals are coupled through their associated line switches into the associated input terminals 40, 42 of differential amplifier 12 which emits an output signal indicative of the informational state of the selected active wire in the area of the selected word line. Subsequently, at time $t_4$, the selected active wire, dummy wire pair are disabled by the removal of pulses 50, 52** from the selected line switches.

Figure 3:
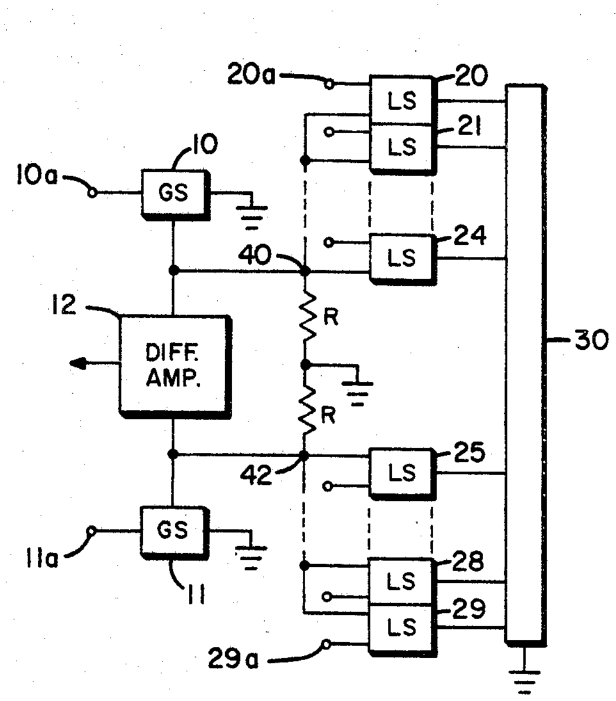
FIG. 3 is an illustration of an equivalent circuit of the illustrated embodiment of FIG. 1.

With particular reference to FIG. 3 there is presented an illustration of an equivalent circuit of the illustrated embodiment of FIG. 1 with particular reference to the line switch discharge paths through the associated grounding switches 10, 11 of the present invention. Operation of the illustrated embodiment of FIG. 3 for the read/write operation is similar to that previously described with particular reference to FIGS. 1 and 2 with the addition of the incorporation of the disabling grounding switch pulse 60 being coupled to terminals 10*a*, 11*a* of grounding switches 10, 11, respectively, during the actual read/write operation. Accordingly, FIG. 2 illustrates pulse 60 as being substantially concurrent in time at both the leading, $t_2$ and trailing edges, $t_3$ of pulses 54, 56. However, such is illustrated as only an idealized memory cycle timing diagram, the preferred embodiment only requiring that the trailing edges of pulses 54, 60 (i.e., the leading edge of enabling pulse 61) be substantially concurrent in time whereupon the trailing edge of the write drive field that is initiated by pulse 54 at bit-driver 14 and the trailing edge of disabling pulse 60 that is coupled to terminals 10*a*, 11*a* of grounding switches 10, 11, respectively, be substantially concurrent in time, $t_3$, whereby the input grounding switches 10, 11 allow the bit-driver 14, differential amplifier 12 at input terminals 40, 42 return to ground potential immediately following write drive current turn-off, i.e., at time $t_3$. Grounding terminals 40, 42 of bit-driver 14 at the termination of the write drive current signal, at time $t_3$, along the selected active wire, dummy wire pair line switches substantially reduces the discharge RC time constant of the nonselected line switches during the time $t_4$ to $t_0$. The so-induced decay voltage signals, due to the charged nonselected line switches during the time $t_4$ to $t_0$, at terminals 40, 42 are substantially decreased in magnitude and duration whereby the memory cycle time may be decreased accordingly.

Figure 4:
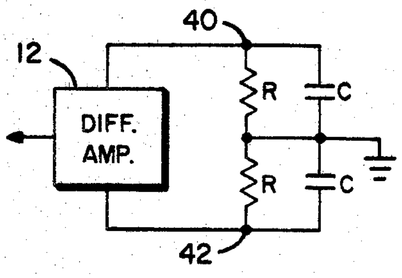
FIG. 4 is an illustration of an equivalent circuit of the circuit of FIG. 3 when no line switches and no grounding switches are enabled.

With particular reference to FIG. 4 there is presented an illustration of an equivalent circuit of the circuit of FIG. 3 when no line switches or grounding switches are enabled. This equivalent circuit illustrates that the discharge RC time constant $\tau_1$ is approximately equal to RC, where in the illustrated embodiment of FIG. 1 $R=200$ ohms.

Figure 5:
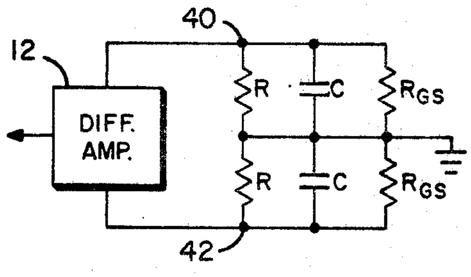
FIG. 5 is an illustration of an equivalent circuit of the circuit of FIG. 3 when no line switches are enabled but the grounding switches are enabled.

With particular reference to FIG. 5 there is presented an illustration of an equivalent circuit of the circuit of FIG. 3 when no line switches are enabled but when the grounding switches are enabled, i.e., from time $t_4$ to $t_0$. This equivalent circuit illustrates that this discharge RC time constant $\tau_2$ is approximately equal to $R_{GS}C$ where the quantity $R_{GS}$ represents the impedance to ground of terminals 40, 42 through their associated ground switches 10, 11, respectively, during the application of enabling pulse 61 to their associated terminals 10*a*, 11*a*, respectively. With the value of $R_{GS}$ being approximately equal to 10 ohms, $R_{GS}$ is approximately equal to $R/20$ whereupon $\tau_2$ is approximately equal to $\tau_1/20$. Accordingly, it is apparent that the addition of grounding switches 10, 11 to the memory system of FIG. 1 has substantially reduced the discharge RC time constant of the associated nonselected line switches 20–29 permitting the drive signal induced decay voltage at terminals 40, 42 to diminish to a negligible signal level in a substantially shorter period of time than that permitted by the prior art method.

Accordingly, it is apparent that the applicant has disclosed herein a preferred embodiment of the present invention that provides a system of grounding switches that couple to ground both common coupled input terminals of a bit-driver, differential sense amplifier arrangement that is coupled to a memory system wherein the grounding switches, during a read or write cycle, are normally in low impedance state, but are switched into a high impedance state only during the actual write-in or read-out of the memory system. Having, now, therefore, fully illustrated and described my invention, what I claim to be new and desire to protect by Letters Patent is set forth in the appended claims.

What is claimed is:

1. In an electronic system including a plurality of disabled electronic circuits and a disabled first grounding switch that are coupled in common to a first terminal and a plurality of disabled electronic circuits and a disabled second grounding switch that are coupled in common to a second terminal, the method of decreasing the discharge time of said electronic circuits comprising:

coupling a disabled current source across said first and second terminals;

electronically enabling only one of the disabled electronic circuits that are coupled to said first terminal; and electronically enabling only one of the disabled electronic circuits that are coupled to said second terminal; and electronically enabling said disabled current source for enabling a current signal to be coupled to said two enabled electronic circuits;

electronically disabling said two enabled electronic circuits; and electronically disabling said enabled current source; and then electronically enabling said disabled first and second grounding switches;

electronically grounding said first and second terminals through said enabled first and second grounding switches for discharging all said disabled electronic circuits through their associated first or second terminal.

2. In an electronic system including a plurality of disabled electronic circuits and a disabled first grounding switch that are coupled in common to a first terminal and a plurality of disabled electronic circuits and a disabled second grounding switch that are coupled in common to a second terminal, the method of decreasing the discharge time of said electronic circuits comprising:

coupling a disabled differential amplifier across said first and second terminals;

electronically enabling only one of the disabled electronic circuits that are coupled to said first terminal; and electronically enabling only one of the disabled electronic circuits that are coupled to said second terminal; and electronically enabling said disabled differential amplifier for enabling current signals to be coupled thereto from said two enabled electronic circuits;

electronically disabling said two enabled electronic circuits; and electronically disabling said enabled differential amplifier; and then electronically enabling said disabled first and second grounding switches;

electronically grounding said first and second terminals through said enabled first and second grounding switches for discharging all said disabled electronic circuits through their associated first or second terminal.

3. In a memory system including first and second memory sections, each of which sections includes a plurality of active wires, a dummy wire and a plurality of line switches, one line switch coupled to an associated one of said active wires and said dummy wire, an addressing means for enabling a selected pair formed of one of said active wires and one of said dummy wires for coupling said selected active wire, dummy wire pair to the first and second input terminals of a parallel coupled bit-driver, differential amplifier, a method of decreasing the discharge time of said line switches, comprising:

coupling first and second grounding switches to said first and second input terminals, respectively, said grounding switches normally enabled for coupling the associated input terminals directly to ground therethrough;

enabling the line switches of a selected active wire, dummy wire pair for enabling a bit-driver write current signal to pass therethrough from said input terminals to said selected active wire, dummy wire pair;

subsequently enabling said bit-driver for permitting a bit-driver write current signal to pass from said input terminals through said enabled line switches to said selected active wire, dummy wire pair; and substantially concurrently disabling said grounding switches for causing them to appear as a high impedance to ground at the associated input terminals;

subsequently disabling said bit-driver, and substantially concurrently enabling said grounding switches; and subsequently disabling the enabled line switches of the selected active wire, dummy wire pair whereby all the disabled line switches are permitted to discharge directly to ground through said enabled grounding switches.

References Cited

UNITED STATES PATENTS 3,425,035 1/1969 Bobeck ------------ 340—174

TERRELL W. FEARS, Primary Examiner

U.S. Cl. X.R.

340—173